(12) United States Patent
Burton et al.

(10) Patent No.: US 6,601,128 B1
(45) Date of Patent: Jul. 29, 2003

(54) METHOD, SYSTEM, PROGRAM, AND DATA STRUCTURE FOR SELECTING A PREFERRED PATH TO A STORAGE DEVICE

(75) Inventors: David Alan Burton, Vail, AZ (US); Robert Louis Morton, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/561,639

(22) Filed: May 2, 2000

(51) Int. Cl.[7] .......................... G06F 12/02; G06F 13/14

(52) U.S. Cl. .......................... 710/316; 710/36; 711/112

(58) Field of Search .................................. 710/5, 36, 38, 710/74, 316; 711/154, 112, 147, 100, 203; 714/48; 709/105; 713/1

(56) References Cited

U.S. PATENT DOCUMENTS

| | | | |
|---|---|---|---|
| 4,007,448 A | * | 2/1977 | Sergeant et al. |
| 4,490,785 A | | 12/1984 | Strecker et al. |
| 4,654,778 A | | 3/1987 | Chiesa et al. |
| 5,479,611 A | * | 12/1995 | Oyama |
| 5,504,882 A | | 4/1996 | Chai et al. |
| 5,504,926 A | * | 4/1996 | Jackson |
| 5,517,615 A | | 5/1996 | Sefidvash et al. |
| 5,530,913 A | | 6/1996 | Scholefield |
| 5,548,711 A | | 8/1996 | Brant et al. |
| 5,561,825 A | | 10/1996 | Yamagami et al. |
| 5,606,679 A | | 2/1997 | Cohn et al. |
| 5,630,169 A | * | 5/1997 | Jackson |

FOREIGN PATENT DOCUMENTS

WO 9917204 4/1999

OTHER PUBLICATIONS

U.S. patent application Ser. No. 09/563,656, filed May 2, 2000, entitled "Method, System, and Program for Updating Firmware to a Storage System Comprised of Multiple Controllers".
U.S. patent application Ser. No. 09/562,685, filed May 2, 2000, entitled "Method, System, and Program for Modifying Preferred Path Assignments to a Storage Device".
IBM, "IBM 7133 Serial Disk System Advanced Models D40 and T40", May 1999, G225–6798–02.
Mylex®, "SANArray™FFx", pp. 1–12.
SCSI, "SCSI–3 Primary Commands", Mar. 28, 1997, pp. 32–40.
Great Britain Patent Office Search Report, dated Dec. 7, 2001.

*Primary Examiner*—Gopal C. Ray
(74) *Attorney, Agent, or Firm*—David Victor; Konrad Raynes Victor & Mann LLP (57) ABSTRACT

Disclosed is a method, system, program, and data structure for selecting a path to one of at least two controllers. Each controller is capable of providing access to storage areas, such as Logical Unit Numbers (LUNs). Path information is received from the controllers indicating a preferred controller to use to access each storage area. An input/output (I/O) command directed to a target storage area is processed and the I/O command is directed to the controller indicated in the path information as the preferred controller for the target storage area. The controller receiving the I/O command executes the I/O command against the target storage area. The path information to the storage controllers providing access to the storage areas is encoded with information designating one controller as the preferred controller and another as a non-preferred controller. The encoded path information is returned to a requesting computer. The requesting computer initially sends an input/output (I/O) command to the preferred controller and sends the I/O command to the non-preferred controller if the preferred controller cannot execute the I/O command.

36 Claims, 4 Drawing Sheets

U.S. PATENT DOCUMENTS

| | | |
|---|---|---|
| 5,640,530 A | 6/1997 | Beardsley et al. |
| 5,675,577 A | 10/1997 | Komatsu |
| 5,689,729 A | 11/1997 | Inoue |
| 5,720,028 A | 2/1998 | Matsumoto et al. |
| 5,802,547 A | 9/1998 | Legvold |
| 5,922,077 A | 7/1999 | Espy et al. |
| 6,393,535 B1 * | 5/2002 | Burton et al. |

* cited by examiner

FIG. 1

| Byte | Bit 7 | Bit 6 | Bit 5 | Bit 4 | Bit 3 | Bit 2 | Bit 1 | Bit 0 |
|------|-------|-------|-------|-------|-------|-------|-------|-------|
| 0-35 | Standard Inquiry Data |||||||||
| 36-43 | Unit Serial Number for LUN |||||||||
| 97 | | | | | | | | PrefPath |
| | | | | | | | | |

METHOD, SYSTEM, PROGRAM, AND DATA STRUCTURE FOR SELECTING A PREFERRED PATH TO A STORAGE DEVICE

CROSS-REFERENCE TO RELATED APPLICATIONS

This application is related to the following co-pending and commonly-assigned patent applications, all of which are filed on the same date herewith, and all of which are incorporated herein by reference in their entirety:

"Method, System, and Program for Modifying Preferred Path Assignments to a Storage Device", to David A. Burton and Robert L. Morton, having application Ser. No. 09/562,685; and "Method, System, and Program for Updating Firmware to a Storage System Comprised of Multiple Controllers", to David A. Burton and Robert L. Morton, having application Ser. No. 09/563,656.

BACKGROUND OF THE INVENTION

1. Field of the Invention

The present invention relates to a system, method, program, and data structure for selecting a preferred path to a storage device and, in particular, providing path information indicating a preferred controller and non-preferred controller that can be used to access the storage device.

2. Description of the Related Art

In prior art storage systems, one or more host computers access a storage space maintained in a storage device through a storage controller. In mass storage systems, the storage device may comprise one or more Direct Access Storage Devices (DASDs), comprised of interconnected hard disk drives. The storage controller manages the flow of data from host systems to DASDs. Host systems view the physical storage space as a partition of Logical Unit Numbers (LUNs). The hosts will submit input/output (I/O) commands to a particular LUN, and the storage controller will translate the target LUN to a physical storage area.

To avoid total system failure in the event that one system component fails, storage controller subsystems incorporate redundant hardware components. For instance, one typical prior art storage subsystem includes multiple storage controller processors to provide hosts multiple paths to the same DASD and LUNs. In the event that one storage controller path fails, the path to the other storage controller can be used to access the DASD.

In high end storage controllers, such as the International Business Machines Corporation (IBM) 3990 and Enterprise System Storage Server,** a host may send an input/output (I/O) command to any host or controller I/O adaptor in the subsystem and the I/O adaptor would then route the I/O to the controller handling the target LUN of that I/O operation. With such prior art high end systems, the host does not need to know the controller that is primarily managing a particular LUN because the controllers include the interface circuitry to route the I/O to the primary controller. Such solutions require expensive interface hardware that is not feasible for lower cost storage subsystems.

**Windows and NT are registered trademarks of Microsoft Corporation; AIX and OS/390 are registered trademarks of IBM and MVS and Fibre Channel Raid Storage Controller are trademarks of IBM.

Lower cost storage subsystems also use two controllers, such as Small Computer System Interface (SCSI) or Fibre Channel controllers, that provide separate paths to the same DASD. However, such systems do not include the interface circuitry and added ports used in the higher end controllers that allow the controllers to route I/Os between the controllers. Instead, with the lower cost storage subsystems, the host will select a path to a storage controller for the I/O operation and could alternate between controllers to reach the LUN. The problem with this solution in the lower cost models is that the storage controllers need to communicate to coordinate the execution of I/O operations against the same LUN to ensure that data consistency is maintained, i.e., a controller with a later instance of data does not write to the same storage location as the other controller which includes an earlier instance of the data. Such cross-controller communications use high latency communication paths to coordinate I/O operations. These coordination activities can introduce significant overhead into the I/O execution process and adversely affect the response time for all I/O operations in the subsystem.

Thus, there is a need in the art for an improved mechanism for selecting the appropriate I/O path that reduces system overhead in processing I/O commands and provides for a failover and failback in the event of a failure along the path to one of the controllers.

SUMMARY OF THE PREFERRED EMBODIMENTS

To overcome the limitations in the prior art described above, preferred embodiments disclose a method, system, program, and data structure for selecting a path to one of at least two controllers. Each controller is capable of providing access to storage areas, such as Logical Unit Numbers (LUNs). Path information is received from the controllers indicating a preferred controller to use to access each storage area. An input/output (I/O) command directed to a target storage area is processed and the I/O command is directed to the controller indicated in the path information as the preferred controller for the target storage area. The controller receiving the I/O command executes the I/O command against the target storage area. In preferred embodiments, the path information to the storage controllers providing access to the storage areas is encoded with information designating one controller as the preferred controller and another as a non-preferred controller. The encoded path information is returned to a requesting computer. The requesting computer initially sends an input/output (I/O) command to the preferred controller and sends the I/O command to the non-preferred controller if the preferred controller cannot execute the I/O command.

Still further, the received path information indicates at least one non-preferred controller to use to access each storage area. The I/O command is directed to one non-preferred controller indicated in the path information for the target storage area if the I/O command directed to the preferred controller fails to complete execution.

In preferred embodiments, the path information from at least one host system to at least two storage controllers providing access to the storage areas is encoded with information designating one controller as a preferred controller and another as a non-preferred controller. The encoded path information is returned to a requesting computer. The requesting computer initially sends an input/output (I/O) command to the preferred controller and sends the I/O command to the non-preferred controller if the preferred controller cannot execute the I/O command.

Still further, when encoding the path information, the designation of one controller as the preferred controller is performed in a manner that balances an I/O workload between the controllers.

Preferred embodiments provide a technique that instructs host systems, such as servers or any other computing system, to direct I/O commands to a target storage area, such as a LUN, to one controller that is designated as the preferred controller. This ensures that I/O commands for a storage area are not directed to both controllers, which could result in delays in processing I/O commands because of the need for the controllers to coordinate the separate execution of I/O commands against the same storage area or LUN. Preferred embodiments further provide a non-preferred controller to use in the event that the connection to the preferred controller is not functioning. Thus, preferred embodiments provide a technique for selecting a controller and path to use for an I/O command that minimizes I/O processing at the controllers and provides for a controller to use during failover if one controller fails.

In preferred embodiments, the designation of the preferred and non-preferred status occurs at the storage controller level, where load balancing considerations can be taken into account in designating a controller as a preferred or non-preferred controller for a storage area.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
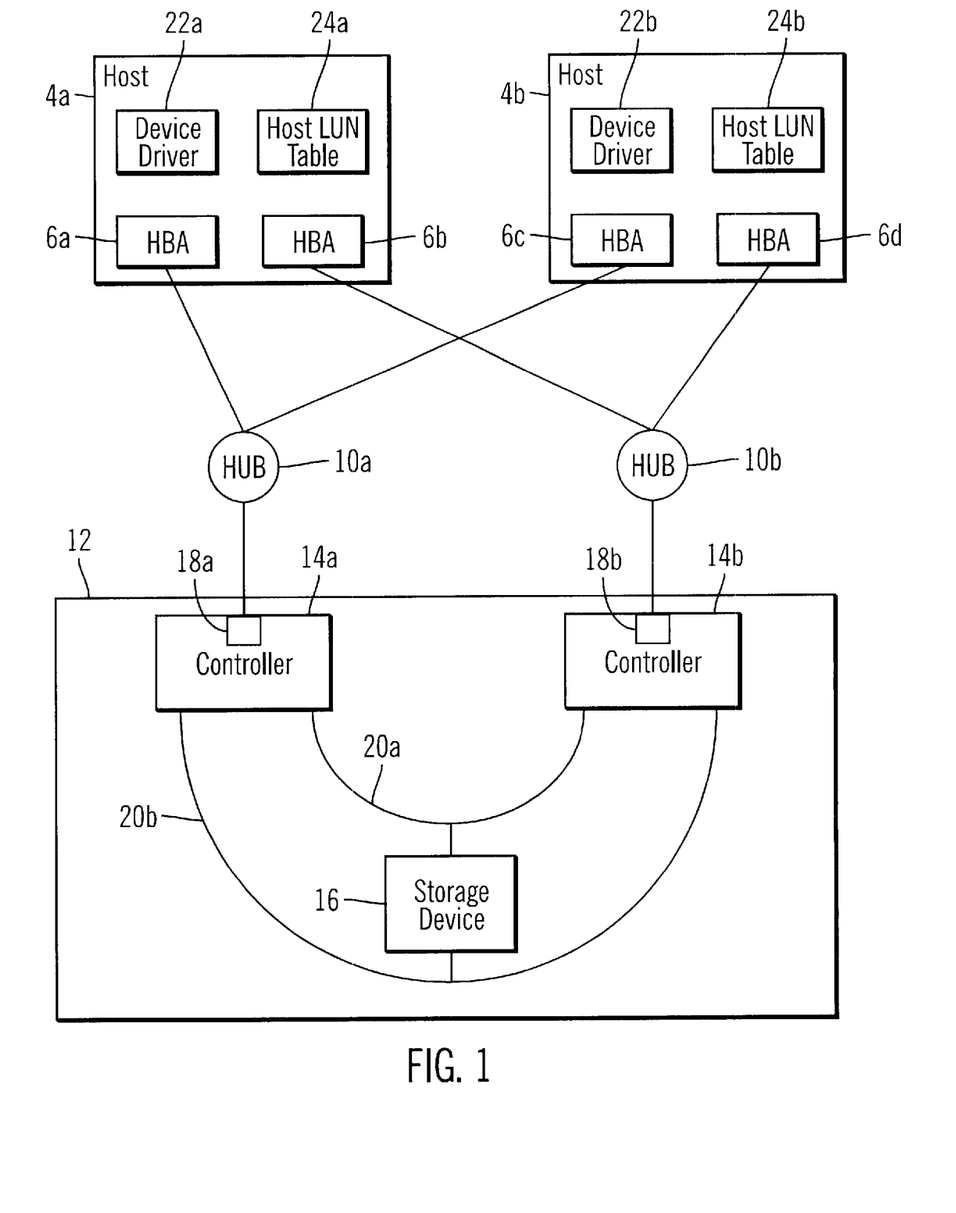
FIG. 1 is a block diagram illustrating a computing environment in which preferred embodiments are implemented.

FIG. 1 illustrates a computing environment in which preferred embodiments are implemented. Hosts 4a, b may comprise any computing device known in the art, including servers through which other client computers can access storage or clients. The hosts 4a, b each include two host bus adaptors (HBAs) 6a, b and 6c, d, respectively. The HBAs 6a, b, c, d may comprise a Fibre Channel or Small Computer System Interface (SCSI) adaptor card or any other network adaptor card known in the art. The HBAs 6a, b, c, d allow the hosts 4a, b to communicate with storage controllers 14a, b via the hubs 10a, b. The hubs 10a, b may comprise the IBM Fibre Channel Storage Hub or Switch, the IBM SAN Fibre Channel Switch, or any other switching device known in the art. A storage subsystem 12 includes two controllers 14a, b that provide access to a storage device 16, such as a DASD. Each controller 14a, b includes at least one port 18a, b, respectively, through which a host 4a, b accesses the controller 14a, b. In preferred implementations, both controllers 14a, b can access any storage location in the storage device 16. The controllers 14a, b may comprise the IBM Fibre Channel Raid Storage Controller or any other storage controller known in the art that provides one or more hosts access to a single storage space or storage devices. Lines 20a, b provide communication from the controllers 14a, b to the storage device 16 such that either controller 14a, b can use the lines 20a, b to access any part of the storage device 16. The lines 20a, b may be implemented using the Fibre Channel interface. In such case, the controllers 14a, b would include Fibre Channel adaptors and the lines 20a, b would comprise cables connected to the controllers 14a, b to form Fibre Channel arbitrated loops (FCAL) to interconnect the controllers 14a, b to the storage device 16 components, e.g., hard disk drives.

In alternative embodiments, multiple hosts may connect to a single storage controller that provides access to a DASD. Storage subsystems that provide access to multiple hosts include high end storage controllers, such as the IBM 3990 and Enterprise Storage Server storage controller products, as well as others. Thus, the term "storage controller" or "controller" as used herein refers to any storage controller, storage server, control unit, or any other computing device that manages input/output (I/O) requests from multiple host systems.

Figure 2:
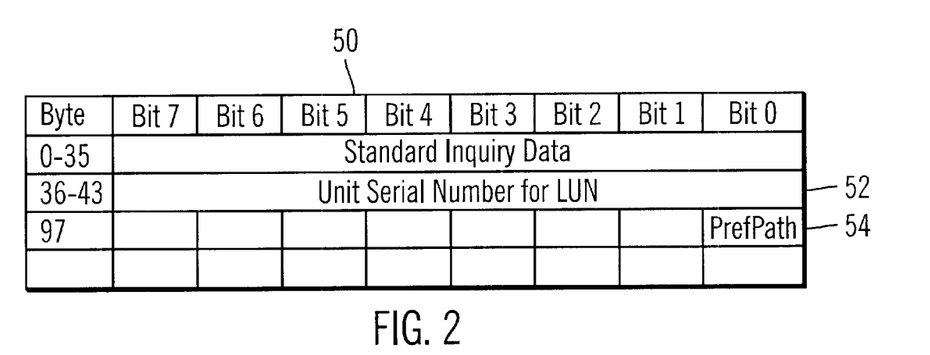
FIG. 2 illustrates the format of inquiry data in accordance with preferred embodiments of the present invention.

Preferred embodiments are implemented using the SCSI protocol. In such case, the controllers 14a, b would provide inquiry data for each LUN, including information concerning parameters of the controller 14a, b and the LUN. FIG. 2 illustrates inquiry data 50 in accordance with the preferred embodiments. Bytes 0 through 35 of the Inquiry data 50 includes the fields found in the inquiry data record described in the "SCSI 3 Primary Commands (SPC)", proposed draft T10/995D revision 11a, dated Mar. 28, 1997 (Copyright ANSI). Preferred embodiments add an eight byte unique serial number field 52, at bytes 36–43, that provides a world wide unique identifier of the LUN for which the inquiry data 50 is maintained. A preferred path field 54 in the inquiry data 50 indicates which controller 14a, b is the preferred target of I/O operations toward the LUN represented by the inquiry data 50. The preferred path assignment is maintained in configuration data.

During configuration, one of the controllers 14a or b would allocate the LUNs between the controllers 14a, b, where the controller 14a, b to which the LUN is allocated comprises the preferred path for that LUN. This allocation of LUNs to a preferred controller is maintained in configuration data indicating preferred and non-preferred controllers for each LUN. The allocation of LUNs to controllers 14a, b may be determined using a load balancing algorithm to assign LUNs to controllers 14a, b in a manner that evenly distributes the I/O processing load between controllers in order to prevent overburdening one of the controllers 14a, b with I/O operations. Alternative techniques may be used to allocate the LUNs to the controllers 14a, b, such as a user specified configuration, random assignment, etc. Preferably, the LUNs are allocated such that each controller 14a, b handles an equivalent number of I/O operations and total bytes accessed for the workloads expected on the LUNs. Each controller maintains the preferred path allocation of the LUNs in non-volatile storage to ensure that all hosts will have the same view of the preferred path for each LUN. When returning inquiry data to a host 4a, b, the controller 14a, b would use the configuration data indicating the preferred path assignment to update the preferred path field 54 of the inquiry data 50 to indicate the preferred path to the LUN. If the subsystem 12 includes two controllers 14a, b, then the preferred path field 54 may comprise one bit, where a zero indicates one controller and a one indicates the other. The controller 14a, b not identified in the preferred path field 54 would be the non-preferred controller.

Figure 3:
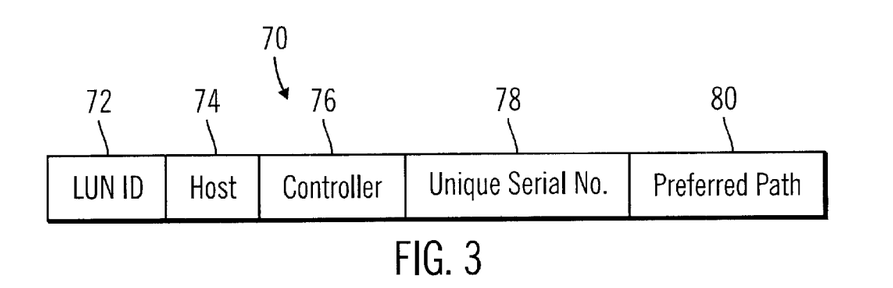
FIG. 3 illustrates an entry in a LUN path table in accordance with preferred embodiments of the present invention.

Each host system 4a, b includes a device driver 22a, b which is used to select a path to use for the I/O operation. A controller path comprises the path from one host 4a, b to the hub 10a, b which connects to a particular controller 14a, b. During initialization, the device driver 22a, b builds a LUN path table 24a, b. FIG. 3 illustrates the fields in an entry 70 of the LUN path table 24a, b maintained in the hosts 4a, b. An entry 70 in the LUN path table 24a, b includes a LUN ID field 72 indicating a LUN number. A host field 74 and controller field 76 indicate a path from a host to a controller for which the entry 70 is maintained. The unique serial number field 78 indicates a unique identifier of the LUN, such as a world wide name. The unique serial number for the storage space is maintained because different hosts 4a, b may assign different LUN numbers to the same physical storage space. The preferred path field 80 indicates whether the host-to-controller path specified in fields 74 and 76 is the preferred path to the LUN, i.e., a boolean value indicating preferred path or not. With the information in the LUN path table, the host 4a, b can determine multiple paths to the same LUN using the different controllers 14a, b and whether a particular controller 14a, b identified in the entry is the preferred or non-preferred controller.

Figure 4:
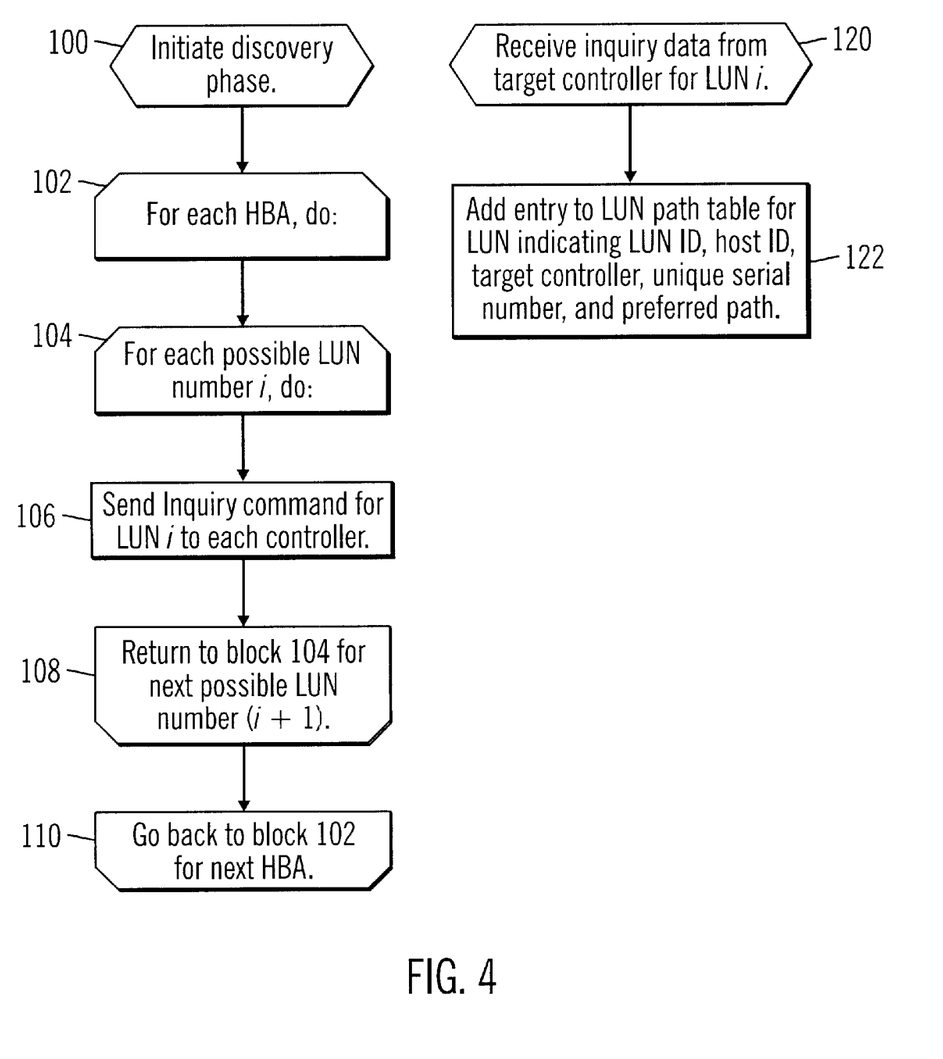
FIG. 4 illustrates logic implemented in a host device driver to build a LUN path table in accordance with preferred embodiments of the present invention.

FIG. 4 illustrates logic implemented in the host device driver 22a, b to build a LUN path table 24a, b indicating preferred path information for a path to a LUN during 4a, b host initialization. Control begins at block 100 with the device driver 22a, b initiating a discovery phase during initialization. The device driver 22a, b then performs a loop at block 102 to 110 for each host bus adaptor 6a, b and 6a, b, respectively, and then a loop at block 104 to 108 for each possible LUN number i. For each LUN number i, the device driver 22a, b sends (at block 104) an inquiry command, such as the SCSI inquiry command, for LUN number i to each controller 14a, b. At block 120, the host 4a, b receives the inquiry data 50 for a LUN number in response to the inquiry command sent at block 104. Upon receiving the inquiry data 50, the device driver 22a, b inserts an entry 70 in the LUN path table 24a, b indicating the LUN number in field 72; the host and controller ID information in fields 74 and 76, respectively, which specifies the path from the host to the controller; the unique serial number for the LUN in field 78; and whether,the host-to-controller path is the preferred path in the preferred path field 80, i.e., the controller 14a, b identified in the controller field 76 is the preferred controller.

Figure 5:
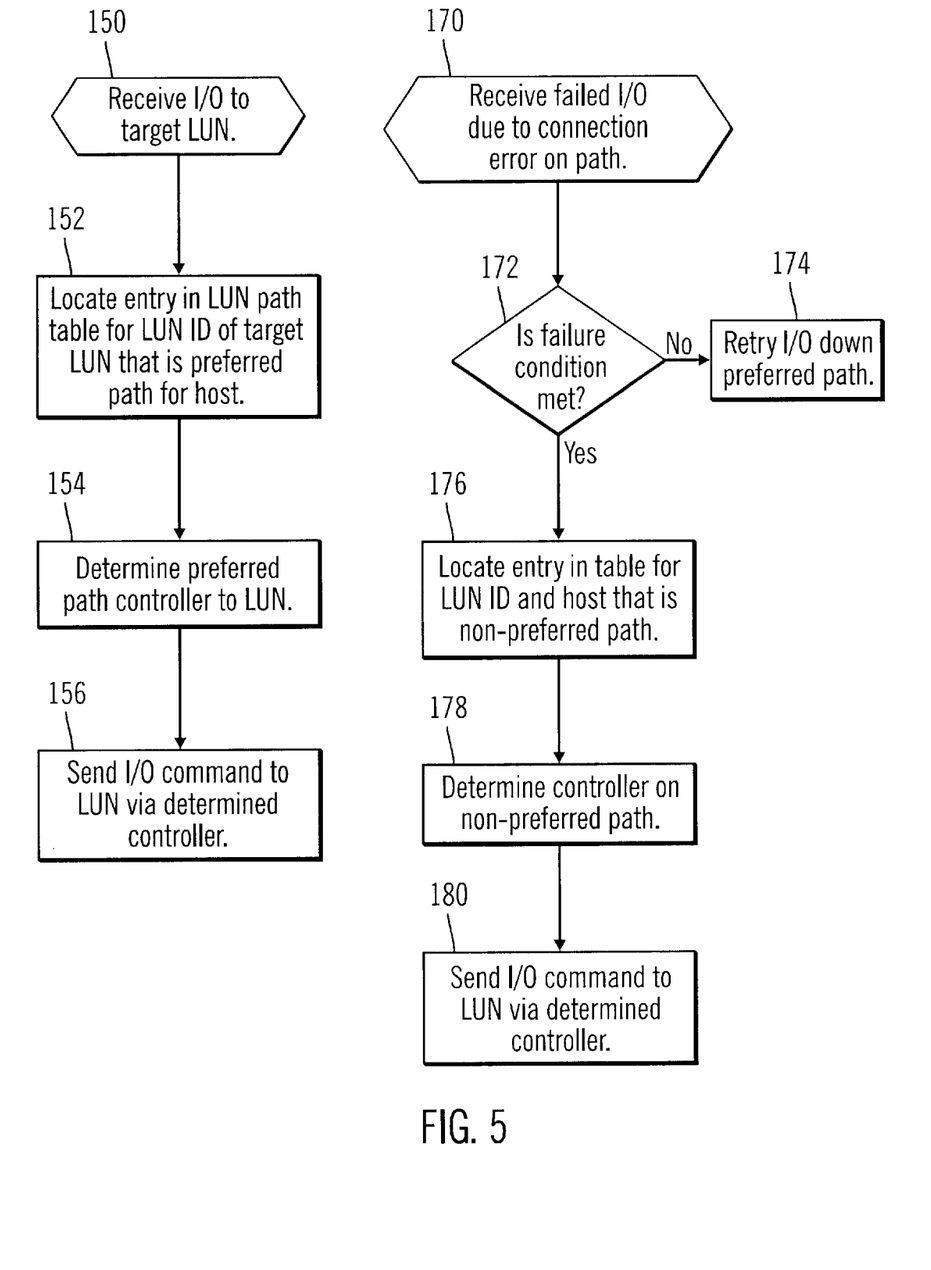
FIG. 5 illustrates logic implemented in a host device driver to select a path for an I/O operation in accordance with preferred embodiments of the present invention.

FIG. 5 illustrates logic implemented in the host device drivers 22a, b to select a path to a controller 14a, b for an I/O operation. Control begins at block 150 with the device driver 22a, b receiving an I/O command to a target LUN. The device driver 22a, b will scan the LUN path table 24a, b to locate (at block 152) an entry for the preferred path (having the preferred path field 80 "on") for the target LUN ID having a host field 74 including the host ID of the initiator host driving the I/O operation The device driver 22a, b then determines (at block 154) from the controller field 76 the controller 14a, b that is the preferred controller, i.e., for the entry having the preferred path field 54 "on". The device driver 22a, b then sends (at block 156) the I/O command down the path to the determined controller 14a or b to execute.

If the host 4a, b receives a message indicating that an I/O failed at block 170, then the device driver 22a, b will check (at block 172) for a failure condition, e.g., whether there have already been the maximum number of consecutive failed retries for a given I/O command. If the failure condition is not met, then the device driver 22a, b will retry (at block 174) the I/O operation down the preferred path. Otherwise, the device driver 22a, b will locate (at block 176) an entry in the LUN path table 24a, b for the target LUN ID and initiating host having the non-preferred path. The device driver 22a, b will then determine (at block 178) the controller 14a or b for this entry (from the controller field 76) and send (at block 180) the I/O operation down the non-preferred path to the determined controller 14a or b.

Preferred embodiments provide modifications to the device driver 22a, b operations to build a LUN path table 24a, b indicating preferred paths to a particular LUN for the host 4a, b. The device driver 22a, b would then use this LUN path table 24a, b to select one of the controllers 14a, b for an I/O operation against a LUN which may be accessed through either controller 14a, b. By using a preferred controller, the host 4a, b reduces the need for the controllers 14a, b to cross-communicate to manage I/O operations to the same target LUN or storage device because the host 4a, b is directing all I/Os to only one of the storage controllers.

With preferred embodiments, after a certain number of failed attempts to complete the I/O operation, the host 4a, b will select the non-preferred controller. Thus a failure at any point in the path from the host 4a, b to the hubs 10a, b to the controllers 14a, b may result in the host 4a, b selecting an alternate, non-preferred controller that avoids the path to the controller containing the failure. At this point, selection of the non-preferred controller would require the controllers 14a, b to engage in the cross-communication, in a manner known in the art, to manage the execution of I/O commands against the same LUN, which may result in delays in I/O processing. However, the preferred technique minimizes any delays necessitated by cross-controller 14a, b management of I/Os to the same LUN because the preferred embodiments tend to always use the same path or one controller 14a, b for I/Os to a particular LUN unless there is a failure.

Preferred embodiments further improve load balancing of I/O processing between the controllers 14a, b because the controllers 14a, b use load balancing optimization to allocate LUN numbers to controllers 14a, b, and the hosts 4a, b uses this preferred controller, designated according to load balancing methods, to access the LUN.

Thus, preferred embodiments optimize I/O processing by using a preferred path to access the LUN selected according to load balancing optimization, and at the same time provide a mechanism for an alternative failback controller and path in the event there is a failure at any point in the path.

Still further, the preferred embodiments allow for load balancing, optimization of I/O processing, and failover and failback to a surviving controller for those lower cost subsystems that only include dedicated ports 18a, b on each controller 14a, b.

Conclusion

The following describes some alternative embodiments for accomplishing the present invention.

The preferred embodiments may be implemented as a method, apparatus or information bearing media using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative embodiments of the present invention.

In preferred embodiments, the storage subsystem 12 included two controllers 14a, b and one port 18a, b on each controller. In further embodiments, the subsystem 12 may include more than two controllers and more than one port on each controller. Further, there may be more than one path from any one host to each controller.

The preferred logic of FIGS. 4 and 5 described specific operations occurring in a particular order. In alternative embodiments, certain of the logic operations may be performed in a different order, modified or removed and still implement preferred embodiments of the present invention. Morever, steps may be added to the above described logic and still conform to the preferred embodiments.

Preferred embodiments were described with respect to SCSI commands, such as the SCSI inquiry command used to obtain inquiry data from a SCSI server. In non-SCSI embodiments, different commands may be used to obtain the inquiry data for a LUN. In such case, the format of the inquiry data the controllers return may differ.

In summary, preferred embodiments disclose a method, system, program, and data structure for selecting a path to one of at least two controllers. Each controller is capable of providing access to storage areas, such as Logical Unit Numbers (LUNs). Path information is received from the controllers indicating a preferred controller to use to access each storage area. An input/output (I/O) command directed to a target storage area is processed and the I/O command is directed to the controller indicated in the path information as the preferred controller for the target storage area. The controller receiving the I/O command executes the I/O command against the target storage area. In preferred embodiments, the path information to the storage controllers providing access to the storage areas is encoded with information designating one controller as the preferred controller and another as a non-preferred controller. The encoded path information is returned to a requesting computer. The requesting computer initially sends an input/output (I/O) command to the preferred controller and sends the I/O command to the non-preferred controller if the preferred controller cannot execute the I/O command.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for selecting a path to one of at least two controllers, wherein each controller is capable of providing access to storage regions in a storage device, comprising:

receiving path information from the controllers indicating a preferred controller to use to access each storage region, wherein each storage region is identified by a logical unit number, wherein each logical unit number is allocated to one of the controllers, and wherein the path information for a storage region indicates the preferred controller to which the logical unit number for that storage region was allocated;

processing a command directed to a target storage region; and directing the command to the controller indicated in the path information as the preferred controller for the target storage region, wherein the controller receiving the command executes the command against the target storage area.

2. The method of claim 1, wherein the commands are capable of comprising read and write commands.

3. A method for selecting a path to one of at least two controllers, wherein each controller is capable of providing access to storage regions in a storage device, comprising:

receiving path information from the controllers indicating a preferred controller to use to access each storage region;

processing a command directed to a target storage region;

directing the command to the controller indicated in the path information as the preferred controller for the target storage region, wherein the controller receiving the command executes the command against the target storage area; and wherein the received path information indicates at least one non-preferred controller to use to access each storage region, further comprising:

directing the command to one non-preferred controller indicated in the path information for the target storage region after the command directed to the preferred controller fails to complete execution.

4. The method of claim 3, further comprising:

building a table including entries indicating a storage region identifier, a controller identifier, and whether the identified controller in the entry is the preferred controller or one non-preferred controller;

scanning the table for one entry for the target storage region when processing the command that indicates that the identified controller is the preferred controller;

scanning the table for one entry for the target storage area that indicates that the identified controller is the non-preferred controller after the command directed to the preferred controller fails to complete execution; and wherein the command is directed to the controller identified in the entry.

5. The method of claim 4, wherein each entry includes a storage region number used to identify the storage region to a computer and a unique identifier of the storage region, wherein different computers may assign different storage region numbers to the same storage regions.

6. The method of claim 4, wherein the table is built by sending commands to the controllers requesting the path information for each storage region, wherein the controllers encode the path information with information indicating whether the controller identified in the entry is the preferred controller or the non-preferred controller.

7. The method of claim 6, wherein the commands are sent to the controllers during initialization.

8. A method for encoding path information defining paths connecting a host system to at least two controllers, wherein each controller provides access to storage regions in a storage device, comprising:
- designating one controller as a preferred controller and another as a non-preferred controller;
- encoding information of the preferred and non-preferred controller designations into the path information; and
- returning the encoded path information to the host system, wherein the host system computer initially sends an input/output (I/O) command to the preferred controller and sends the I/O command to the non-preferred controller if the preferred controller cannot execute the I/O command.

9. The method of claim 8, wherein the designation of one controller as the preferred controller is performed in a manner that balances an I/O workload between the controllers.

10. The method of claim 8, wherein the designation of the controllers occurs during initialization of the controllers.

11. A system for selecting a path to one of at least two controllers, wherein each controller is capable of providing access to storage regions in a storage device, comprising:
- means for receiving path information from the controllers indicating a preferred controller to use to access each storage region, wherein each storage region is identified by a logical unit number, wherein each logical unit number is allocated to one of the controllers, and wherein the path information for a storage region indicates the preferred controller to which the logical unit number for that storage region was allocated;
- means for processing a command directed to a target storage region; and
- means for directing the command to the controller indicated in the path information as the preferred controller for the target storage region, wherein the controller receiving the command executes the command against the target storage area.

12. The system of claim 11, wherein the commands are capable of comprising read and write commands.

13. A system for selecting a path to one of at least two controllers wherein each controller is capable of providing access to storage regions in a storage device, comprising:
- means for receiving path information from the controllers indicating a preferred controller to use to access each storage region;
- means for processing a command directed to a target storage region;
- means for directing the command to the controller indicated in the path information as the preferred controller for the target storage region, wherein the controller receiving the command executes the command against the target storage area; and
- wherein the received path information indicates at least one non-preferred controller to use to access each storage region, further comprising:
  - means for directing the command to one non-preferred controller indicated in the path information for the target storage region after the command directed to the preferred controller fails to complete execution.

14. The system of claim 13, further comprising:
- means for building a table including entries indicating a storage region identifier, a controller identifier, and whether the identified controller in the entry is the preferred controller or one non-preferred controller;
- means for scanning the table for one entry for the target storage region when processing the command that indicates that the identified controller is the preferred controller;
- means for scanning the table for one entry for the target storage area that indicates that the identified controller is the non-preferred controller after the command directed to the preferred controller fails to complete execution; and
- wherein the I/O command is directed to the controller identified in the entry.

15. The system of claim 14, wherein each entry includes a storage region number used to identify the storage region to a computer and a unique identifier of the storage region, wherein different computers may assign different storage region numbers to the same storage regions.

16. The system of claim 14, wherein the table is built by sending commands to the controllers requesting the path information for each storage region, wherein the controllers encode the path information with information indicating whether the controller identified in the entry is the preferred controller or the non-preferred controller.

17. The system of claim 16, wherein the commands are sent to the controllers during initialization.

18. A system for encoding path information defining paths, comprising:
- two controllers, wherein the paths provide connections from a host system to the controllers, and wherein each controller provides access to storage regions in a storage device;
- means for designating one controller as a preferred controller and another as a non-preferred controller;
- means for encoding information of the preferred and non-preferred controller designations into the path information; and
- means for returning the encoded path information to the host system, wherein the host system initially sends an input/output (I/O) command to the preferred controller and sends the I/O command to the non-preferred controller if the preferred controller cannot execute the I/O command.

19. The system of claim 18, wherein the designation of one controller as the preferred controller is performed in a manner that balances an I/O workload between the controllers.

20. The system of claim 18, wherein the designation of the controllers occurs during initialization of the controllers.

21. An information bearing medium for encoding path information defining paths connecting a host system to at least two controllers, wherein each controller provides access to storage regions in a storage device, wherein the information bearing medium comprises code capable of causing a computer to perform:
- receiving path information from the controllers indicating a preferred controller to use to access each storage region, wherein each storage region is identified by a logical unit number, wherein each logical unit number is allocated to one of the controllers, and wherein the path information for a storage region indicates the preferred controller to which the logical unit number for that storage region was allocated;
- processing a command directed to a target storage region; and
- directing the command to the controller indicated in the path information as the preferred controller for the target storage region, wherein the controller receiving the command executes the command against the target storage area.

22. The information bearing medium of claim 21, wherein the commands are capable of comprising read and write commands.

23. An information bearing medium for encoding path information defining paths connecting a host system to at least two controllers, wherein each controller provides access to storage regions in a storage device, wherein the information bearing medium comprises code capable of causing a computer to perform:

receiving path information from the controllers indicating a preferred controller to use to access each storage region;

processing a command directed to a target storage region;

directing the command to the controller indicated in the path information as the preferred controller for the target storage region, wherein the controller receiving the command executes the command against the target storage area; and wherein the received path information indicates at least one non-preferred controller to use to access each storage region, further comprising:

directing the command to one non-preferred controller indicated in the path information for the target storage region after the command directed to the preferred controller fails to complete execution.

24. The information bearing medium of claim 23, further comprising:

building a table including entries indicating a storage region identifier, a controller identifier, and whether the identified controller in the entry is the preferred controller or one non-preferred controller;

scanning the table for one entry for the target storage region when processing the command that indicates that the identified controller is the preferred controller;

scanning the table for one entry for the target storage area that indicates that the identified controller is the non-preferred controller after the command directed to the preferred controller fails to complete execution; and wherein the I/O command is directed to the controller identified in the entry.

25. The information bearing medium of claim 24, wherein each entry includes a storage region number used to identify the storage region to a computer and a unique identifier of the storage region, wherein different computers may assign different storage region numbers to the same storage regions.

26. The information bearing medium of claim 24, wherein the table is built by sending commands to the controllers requesting the path information for each storage region, wherein the controllers encode the path information with information indicating whether the controller identified in the entry is the preferred controller or the non-preferred controller.

27. The information bearing medium of claim 26, wherein the commands are sent to the controllers during initialization.

28. An information bearing medium for encoding path information defining paths connecting a host system to at least two controllers, wherein each controller provides access to storage regions in a storage device, and wherein the information bearing medium includes code capable of causing a computer to perform:

designating one controller as a preferred controller and another as a non-preferred controller;

encoding information of the preferred and non-preferred controller designations into the path information; and returning the encoded path information to a requesting computer, wherein the requesting computer initially sends an input/output (I/O) command to the preferred controller and sends the I/O command to the non-preferred controller if the preferred controller cannot execute the I/O command.

29. The information bearing medium of claim 28, wherein the designation of one controller as the preferred controller is performed in a manner that balances an I/O workload between the controllers.

30. The information bearing medium of claim 28, wherein the designation of the controllers occurs during initialization of the controllers.

31. A computer-readable medium containing path information indicating one of at least two controllers to use to access each storage region in a storage device, wherein one control is designated as a preferred path controller and another controller is designated as a non-preferred controller, wherein each controller is capable of providing access to the storage regions in the storage device, and wherein a command to a target storage region is directed to the controller indicated in the path information as the preferred controller for the target storage region, wherein each storage region is identified by a logical unit number, wherein each logical unit number is allocated to one of the controllers, and wherein the path information for a storage region indicates the preferred controller to which the logical unit number for that storage region was allocated.

32. A computer-readable medium containing path information indicating one of at least two controllers to use to access each storage region in a storage device, wherein one control is designated as a preferred path controller and another controller is designated as a non-preferred controller, wherein each controller is capable of providing access to the storage regions in the storage device, and wherein a command to a target storage region is directed to the controller indicated in the path information as the preferred controller for the target storage region, wherein the path information further indicates at least one non-preferred controller to use to access each storage region, wherein the command is directed to one non-preferred controller indicated in the path information for the target storage region after the command directed to the preferred controller fails to complete execution.

33. The computer-readable medium of claim 32, wherein the path information further comprises a table including entries indicating a storage region identifier, a controller identifier, and information indicating whether the identified controller in the entry is the preferred controller or one non-preferred controller, wherein the table is scanned to identify one preferred or non-preferred controller to use to access a storage region, the I/O command is directed to the controller identified in the entry.

34. The computer-readable medium of claim 33, wherein each entry includes a storage region number used to identify the storage region to a computer and a unique identifier of the storage region, wherein different computers may assign different storage region numbers to the same storage regions.

35. The computer-readable medium of claim 32, wherein one controller is designated as a preferred controller and another as a non-preferred controller;

encoding information of the preferred and non-preferred controller designations into the path information; and returning the encoded path information to the host system, wherein the host system computer initially sends an input/output (I/O) command to the preferred controller and sends the I/O command to the non-preferred controller if the preferred controller cannot execute the I/O command.

36. The computer-readable medium of claim 32, wherein the designation of one controller as the preferred controller is performed in a manner that balances an I/O workload between the controllers.

* * * * *